(12) United States Patent
Chang

(10) Patent No.: US 8,223,249 B2
(45) Date of Patent: Jul. 17, 2012

(54) IMAGE SENSING MODULE WITH PASSIVE COMPONENTS AND CAMERA MODULE HAVING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 124 days.

(21) Appl. No.: 12/730,254

(22) Filed: Mar. 24, 2010

(65) Prior Publication Data

US 2011/0043686 A1 Feb. 24, 2011

(30) Foreign Application Priority Data

Aug. 21, 2009 (CN) .......................... 2009 1 0305885

(51) Int. Cl.
*H04N 5/225* (2006.01)
(52) U.S. Cl. ........................................ 348/340
(58) Field of Classification Search ................. 348/340; 438/64, 68
See application file for complete search history.

(56) References Cited

U.S. PATENT DOCUMENTS

| 7,884,875 B2* | 2/2011 | Kwon et al. ................... 348/340 |
|---|---|---|
| 2006/0152615 A1* | 7/2006 | Kwon et al. ................... 348/340 |
| 2007/0126912 A1* | 6/2007 | De Bruin et al. .............. 348/340 |
| 2009/0059055 A1* | 3/2009 | Nakano et al. ................ 348/340 |
| 2009/0122176 A1* | 5/2009 | Wu et al. ........................ 348/340 |
| 2009/0122178 A1* | 5/2009 | Kwon et al. ................... 348/340 |
| 2009/0322929 A1* | 12/2009 | Webster ........................ 348/340 |

* cited by examiner

Primary Examiner — Kelly L Jerabek
(74) Attorney, Agent, or Firm — Altis Law Group, Inc.

(57) ABSTRACT

An exemplary image sensing module includes a base, a transparent plate, many first electrically conductive poles, an image sensor, and many passive components. The base includes a top surface and a recess defined in the top surface. The transparent plate is mounted on the top surface of the base, and covers the recess. The transparent plate includes a first surface facing away from the recess. The first electrically conductive poles extend through the transparent plate. The image sensor is received in the recess of the base. The passive components are attached on the first surface of the transparent plate, and surround the image sensor. The passive elements are connected electrically with the image sensor via the first electrically conductive poles.

16 Claims, 2 Drawing Sheets

IMAGE SENSING MODULE WITH PASSIVE COMPONENTS AND CAMERA MODULE HAVING SAME

BACKGROUND

1. Technical Field

The present disclosure relates to optical imaging and particularly, to an image sensing module, and a camera module having the image sensing module.

2. Description of Related Art

Image sensing modules having an image sensor are essential devices that have been widely used in camera modules. Generally, to allow the image sensing modules to operate, some peripheral electronic components associated with the image sensor are often used together with the image sensor. For example, a passive component is combined to filter output signals from the image sensor, thereby improving the imaging performance and eliminating the crosstalk noise which occurs during signal switching and transmission.

A typical camera module includes an image sensing module, and a lens module. The image sensing module includes a base, an image sensor, and several passive components. The image sensor and the passive components are both disposed on the base and electrically connected to the base. The lens module is mounted on the base, and together with the base to form a receiving cavity for receiving the image sensor and the passive components therein. However, large amount of the base is normally required to accommodate both the passive components and the image sensor. Therefore, the base must be big enough for mounting the image sensor and the passive components thereon. This structure of the camera module mentioned above conflicts with the tendency for miniaturization of the camera module and the electronic products.

Therefore, what is needed is a compact image sensing module, and a compact camera module with the image sensing module, which can overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The embodiments will now be described in detail below with reference to the drawings.

Figure 1:
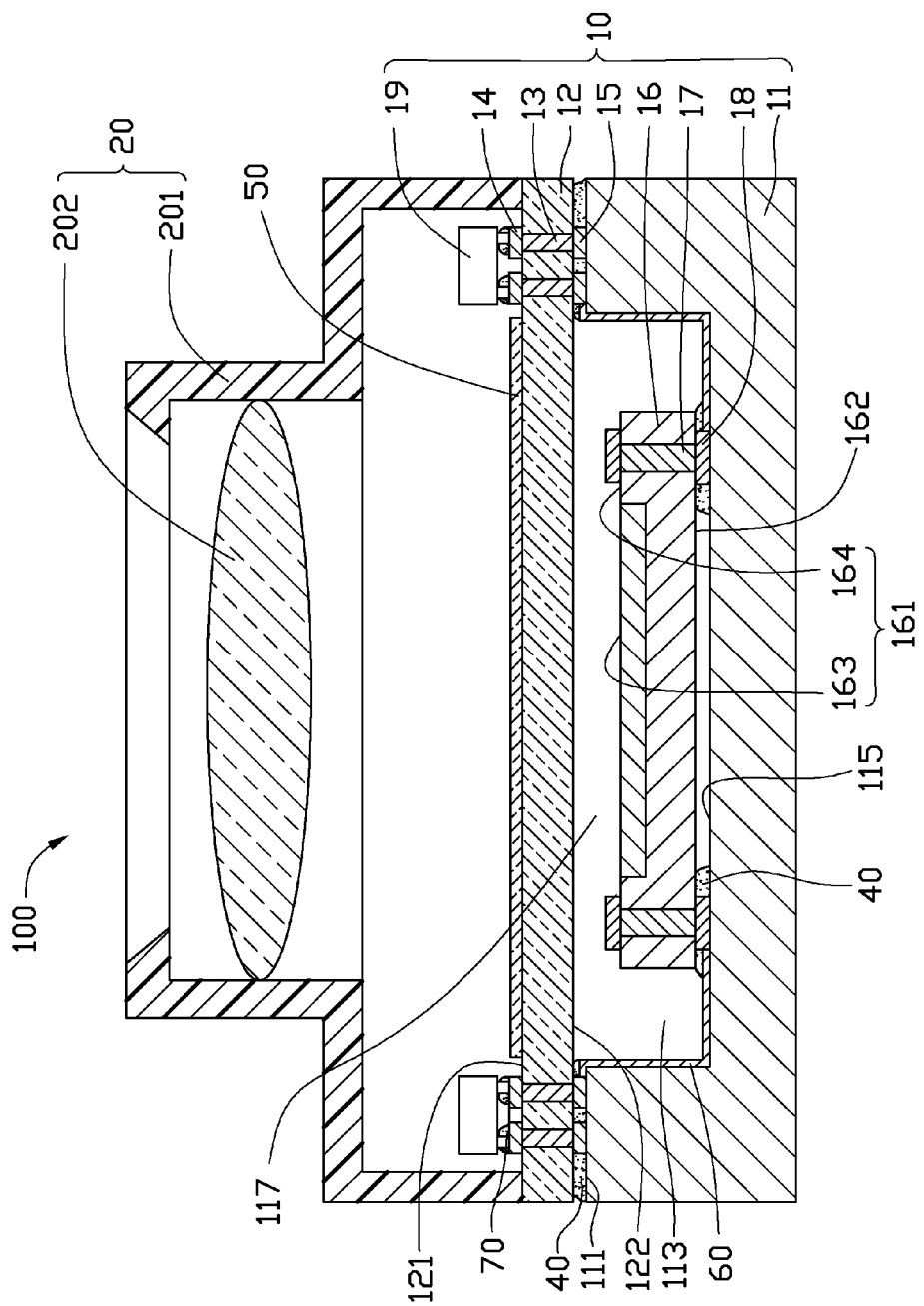
FIG. 1 is a schematic, sectional view of a camera module according to a first embodiment.

Referring to FIG. 1, a camera module 100 according to a first embodiment is shown. The camera module 100 includes an image sensing module 10, and a lens module 20 mounted on the image sensing module 10.

The image sensing module 10 is configured for receiving light from the lens module 20 and converting the light into electronic image data. The image sensing module 10 includes a base 11, and a transparent plate 12. Embedded in the transparent plate 12 are four first electrically conductive poles 13. Four first electrically conductive pads 14 and four second electrically conductive pads 15 are respectively mounted on the opposite surfaces of the transparent plate 12. An image sensor 16 is mounted on the base 11. Two second electrical conductive poles 17 extend through the image sensor 16, and are electrically connected with the image sensor 16. Two third electrically conductive pads 18 are between the image sensor 16 and the base 11, and mounted on the image sensor 16. Two passive components 19 are mounted on the transparent plate 12, and are electrically connected with the first electrical conductive poles 13.

The base 11, may be made of ceramic, glass, plastic, laminate or other suitable material. The base 11 is configured for supporting the image sensor 16. The base 11 includes a top surface 111 for supporting the transparent plate 12. A recess 113 is defined in the top surface 111 of the base 11 for receiving the image sensor 16.

The transparent plate 12 is mounted on the top surface 111 of the base 11 with an adhesive 40, and covers the recess 113, so that the transparent plate 12 and the base 11 cooperatively define a receiving cavity 117 for receiving the image sensor 16. The transparent plate 12 is configured for supporting the passive elements 19 and protecting the image sensor 16 from being contaminated by exterior conditions. The transparent plate 12 is made of a transparent material such as glass, quartz, etc. The transparent plate 12 includes a first surface 121 facing away from the recess 113, and an opposite second surface 122 facing the recess 113. The first surface 121 is configured for supporting the passive components 19 thereon. In the present embodiment, an infrared filter 50 is formed on the first surface 121 for preventing infrared light from reaching the image sensor 16. In other embodiments, the infrared filter 50 may instead be formed on the second surface 122.

The first electrical conductive poles 13 surround the image sensor 16, and are configured for electrically connecting the passive components 19 to the image sensor 16. Two of the first electrical conductive poles 13 extend through the left side of the transparent plate 12, and the other first electrically conductive poles 13 extend through the right side of the transparent plate 12. In the present embodiment, the first electrically conductive poles 13 are made of aluminum. In other embodiments, the first electrically conductive poles 13 may instead be made of silver, copper, etc.

The four first electrically conductive pads 14 are mounted on the first surface 121 of the transparent plate 12. The first electrically conductive pads 14 are configured for electrically connecting the corresponding first electrically conductive poles 13 to the corresponding passive components 19. In other embodiments, the first electrically conductive pads 14 could be omitted. In such case, the passive components 19 may be connected electrically with the corresponding first electrically conductive poles 13 with tin solder 70.

The four second electrically conductive pads 15 are mounted on the second surface 122 of the transparent plate 12. The second electrically conductive pads 15 are configured for electrically connecting the corresponding first electrically conductive poles 13 to the image sensor 16.

The image sensor 16 received in the receiving cavity 117 is a photosensitive element responsive to infrared radiation, ultraviolet radiation, or visible light beams and transforms light signals into electronic signals. The image sensor 16 includes an upper surface 161 and an opposite lower surface 162. The upper surface 161 of the image sensor 16 includes a light sensitive region 163 and a light non-sensitive region 164 surrounding the light sensitive region 163. The lower surface 162 is mounted on the bottom surface 115 of the recess 113 with adhesive 40.

The second electrically conductive poles 17 are embedded in the light non-sensitive region 164, and configured for electrically connecting the image sensor 16 to the passive components 19.

The two third electrically conductive pads 18 are mounted on the lower surface 162 of image sensor 16, and connect electrically with the corresponding second electrically conductive poles 17. The third electrically conductive pads 18 are connected electrically with the corresponding second electrically conductive pads 15 by electrically conductive adhesive 60, thereby connecting electrically the second electrically conductive poles 17 to the corresponding first electrically conductive poles 13.

The passive components 19 such as inductors, capacitors or resistors, etc., are attached on the first surface 121, and surround the image sensor 16. The passive components 19 are generally used for improving the transmission quality of image signals outputted from the image sensor 16. The passive components 19 are connected electrically to the corresponding first electrically conductive pads 14 with tin solders 70, thereby connecting electrically the passive components 19 with the image sensor 16.

It should be noted that in alternative embodiments, the number of the first electrically conductive poles 13, the number of the second electrically conductive poles 17, and the number of the passive components 19 may instead be three, four, etc.

The lens module 20 is mounted on the first surface 121 of the transparent plate 12, and includes a lens holder 201, and a lens 202 received in the lens holder 201. The lens holder 201 is directly mounted on the first surface 121. It is noteworthy that lenses of any number and type could be used in the camera module 100.

In the camera module 100, the base 11 is configured for receiving the image sensor 16 therein, and the passive components 19 are supported by the transparent plate 12 over the image sensor 16. Therefore, the size of the base 11 can be reduced. Accordingly, the whole camera module 100 using the base 11 can be miniaturized. The image sensor 16 and the passive components 19 are respectively disposed on the two opposite sides of the transparent plate 12. Hence, heat produced by the passive components 19 will not affect normal operation of the image sensor 16, thereby improving the imaging performance of the image sensor 16. In addition, because there is no wire bonding in the image sensing module 10, the image sensing module 10 is more compact. Accordingly the camera module 100 with the image sensing module 10 can be more compact.

Figure 2:
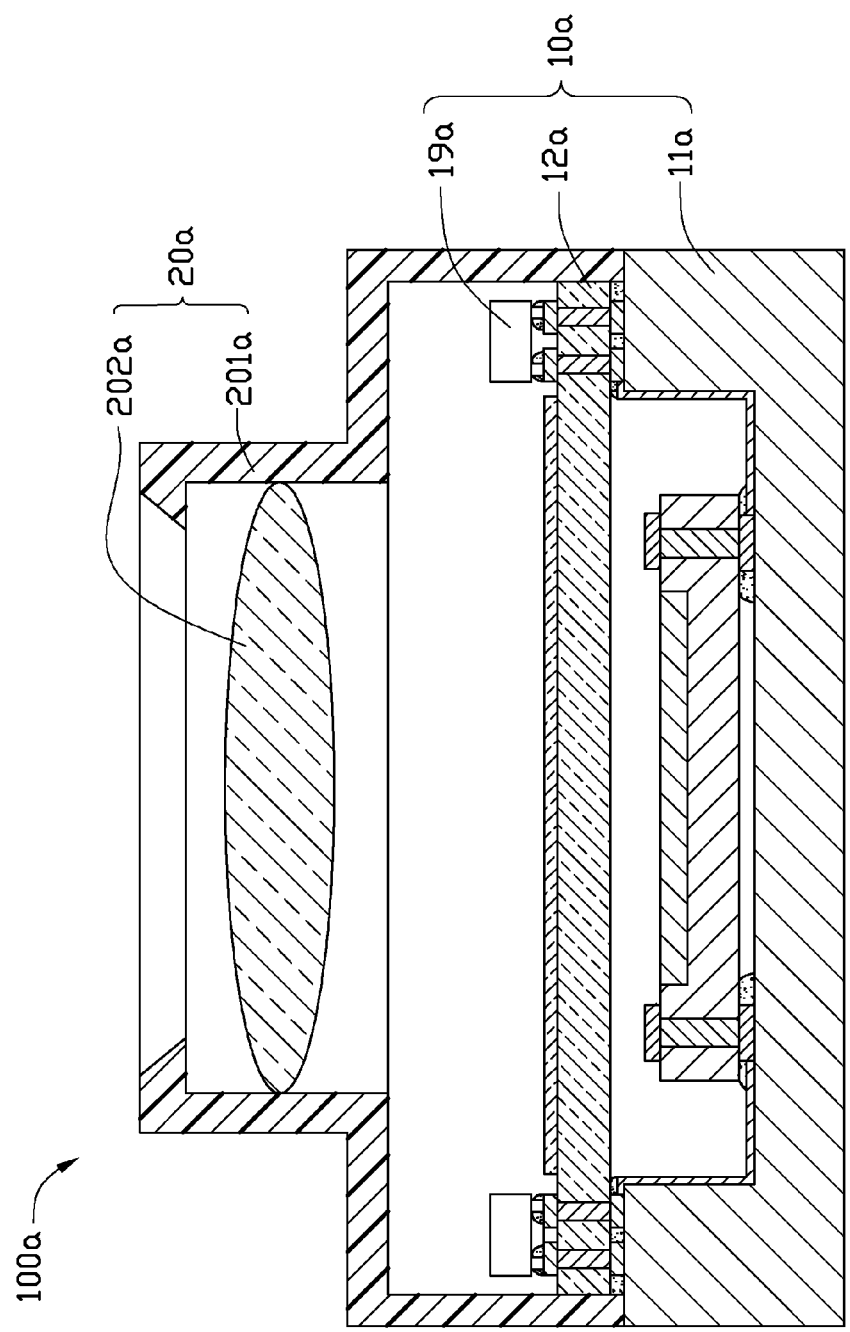
FIG. 2 is a schematic, sectional view of a camera module according to a second embodiment.

Referring to FIG. 2, a camera module 100a similar to the camera module 100, in accordance with a second embodiment, is shown. The camera module 100a includes an image sensing module 10a and a lens module 20a. The lens module 20a includes a lens holder 201a and a lens 202a received in the lens holder 201a.

The image sensing module 10a includes a base 11a, a transparent plate 12a, and two passive components 19a formed on the transparent plate 12a. The lens module 20a is directly mounted on the base 11a, thereby making the lens holder 201a surrounding the transparent plate 12a.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope and spirit of the appended claims.

What is claimed is:

1. An image sensing module comprising:
   a base comprising a top surface and a recess defined in the top surface;
   a transparent plate mounted on the top surface of the base, and covering the recess, the transparent plate comprising a first surface facing away from the recess;
   a plurality of first electrically conductive poles extending through the transparent plate;
   an image sensor received in the recess of the base, the image sensor comprising a light sensitive region and a light non-sensitive region surrounding the light sensitive region;
   a plurality of passive components attached on the first surface of the transparent plate and surrounding the image sensor, the passive components being connected electrically to the image sensor via the first electrically conductive poles; and
   a plurality of second electrically conductive poles, wherein the second electrically conductive poles extend through the light non-sensitive region of the image sensor, and electrically connect the image sensor to the first electrically conductive poles.

2. The image sensing module of claim 1, further comprising a plurality of first electrically conductive pads mounted on the first surface, wherein the first electrically conductive pads electrically connect the passive components to the corresponding first electrically conductive poles.

3. The image sensing module of claim 2, further comprising a plurality of second electrically conductive pads mounted on a second surface of the transparent plate opposite to the first surface of the transparent plate, a plurality of third electrically conductive pads mounted on a lower surface of the image sensor, and electrically conductive adhesives applied in the recess, wherein the electrically conductive adhesives electrically connect the third electrically conductive pads to the corresponding second electrically conductive pads, thereby electrically connecting the second electrically conductive poles to the corresponding first electrically conductive poles.

4. The image sensing module of claim 1, wherein the transparent plate is made of a transparent material.

5. The image sensing module of claim 4, wherein the transparent material is selected from the group consisting of glass and quartz.

6. The image sensing module of claim 1, further comprising a plurality of electrically conductive pads mounted on a second surface of the transparent plate opposite to the first surface of the transparent plate, a plurality of electrically conductive pads mounted on a lower surface of the image sensor, and electrically conductive adhesives applied in the recess, wherein the electrically conductive adhesives electrically connect the electrically conductive pads on the lower surface of the image sensor to the corresponding electrically conductive pads mounted on the second surface of the transparent plate, thereby electrically connecting the second electrically conductive poles to the corresponding first electrically conductive poles.

7. The image sensing module of claim 1, further comprising an infrared filter formed on the transparent plate for preventing infrared light from reaching the image sensor.

8. A camera module comprising:
   an image sensing module comprising:
   a base comprising a top surface and a recess defined thereon;

a transparent plate mounted on the top surface of the base, and covering the recess, the transparent plate comprising a first surface facing away from the recess;

a plurality of first electrically conductive poles embedded in the transparent plate;

a plurality of second electrically conductive poles;

an image sensor received in the recess of the base, the image sensor comprising a light sensitive region and a light non-sensitive region surrounding the light sensitive region, the second electrically conductive poles being embedded in the light non-sensitive region of the image sensor, and electrically connecting the image sensor to the first electrically conductive poles; and a plurality of passive components attached on the first surface of the transparent plate and surrounding the image sensor, the passive components being electrically connected to the image sensor via the first electrically conductive poles; and a lens module comprising a lens holder and a lens received in the lens holder, the lens holder attached on the first surface of the transparent plate.

9. The camera module of claim 8, wherein the image sensing module further comprises a plurality of first electrically conductive pads mounted on the first surface, and the first electrically conductive pads electrically connect the passive components to the corresponding first electrically conductive poles.

10. The camera module of claim 9, wherein the image sensing module further comprises a plurality of second electrically conductive pads mounted on a second surface of the transparent plate opposite to the first surface of the transparent plate, a plurality of third electrically conductive pads mounted on a lower surface of the image sensor, and electrically conductive adhesives applied in the recess, wherein the electrically conductive adhesives electrically connect the third electrically conductive pads to the corresponding second electrically conductive pads, thereby electrically connecting the second electrically conductive poles to the corresponding first electrically conductive poles.

11. The camera module of claim 8, wherein the image sensing module further comprises tin solders electrically connecting the passive components to the corresponding first electrically conductive poles.

12. The camera module of claim 8, wherein the image sensing module further comprises a plurality of first electrically conductive pads mounted on a second surface of the transparent plate opposite to the first surface of the transparent plate, a plurality of second electrically conductive pads mounted on a lower surface of the image sensor, and electrically conductive adhesives applied in the recess, wherein the electrically conductive adhesives electrically connect the first electrically conductive pads to the corresponding second electrically conductive pads, thereby electrically connecting the second electrically conductive poles to the corresponding first electrically conductive poles.

13. The camera module of claim 8, wherein the image sensing module further comprises an infrared filter formed on the transparent plate for preventing infrared light from reaching the image sensor.

14. An image sensing module comprising:

a base comprising a top surface and a recess defined in the top surface;

a transparent plate mounted on the top surface of the base, and covering the recess, the transparent plate comprising a first surface facing away from the recess;

a plurality of first electrically conductive poles extending through the transparent plate;

an image sensor received in the recess of the base, the image sensor being connected electrically to the plurality of first electrically conductive poles;

a plurality of passive components attached on the first surface of the transparent plate and surrounding the image sensor; and tin solders electrically connecting the passive components to the corresponding first electrically conductive poles.

15. The image sensing module of claim 14, further comprising a plurality of first electrically conductive pads mounted on a second surface of the transparent plate opposite to the first surface of the transparent plate, a plurality of second electrically conductive pads mounted on a lower surface of the image sensor, and electrically conductive adhesives applied in the recess, wherein the electrically conductive adhesives electrically connect the first electrically conductive pads to the corresponding second electrically conductive pads, thereby electrically connecting the second electrically conductive poles to the corresponding first electrically conductive poles.

16. The image sensing module of claim 15, further comprising an infrared filter formed on the transparent plate for preventing infrared light from reaching the image sensor.

* * * * *